DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED MAY 19, 1970

874 O.G. 697

T874,006

REGENERATION OF PHOTOGRAPHIC BLEACH BATHS BY TREATMENT WITH OZONE

Bernard A. Hutchins, Livonia, N.Y. (1669 Lake Ave., Rochester, N.Y. 14650), and James J. Wade, Rochester, N.Y. (59 W. Buffalo Road, Churchville, N.Y. 14428)

Filed Feb. 3, 1969, Ser. No. 796,189
Int. Cl. G03c *5/32*
U.S. Cl. 96—60
No Drawing. 10 Pages Specification

Spent ferricyanide bleach solutions which have been used in photographic processing are regenerated by treatment with ozone. The ozone serves to oxidize the ferrocyanide which is formed in use to ferricyanide. Oxidation of ferrocyanide by the action of ozone may also be utilized as a method of preparing fresh ferricyanide bleach.

The pH of the spent bleach solution should be in the range from about 6 to about 10, and more preferably from about 7 to about 9, during introduction of the ozone. Control of the pH is achieved by addition of acid to the solution and it is preferred to employ hydrobromic acid for this purpose and thereby furnish bromide to the solution to compensate for the depletion of bromide which occurs in use. The ozone should be employed in an amount of not more than about one gram of ozone for every nine grams of ferrocyanide.

Regeneration of spent ferricyanide bleach solution by treatment with ozone may be effectively accomplished as a continuous process in which portions of the beach solution are removed continuously or at selected intervals from the processing tank, treated with ozone while maintaining the pH at about 6 to about 10 by addition of acid, and then returned to the processing tank.